United States Patent
Skillermark et al.

(10) Patent No.: US 8,363,746 B2
(45) Date of Patent: Jan. 29, 2013

(54) METHOD TO MODIFY THE FREQUENCY HOPPING SCHEME BY EXTENDING THE VALIDITY OF THE REFERENCE SIGNALS

(75) Inventors: Per Skillermark, Stockholm (SE); Anders Furuskar, Stockholm (SE); Erik Dahlman, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 326 days.

(21) Appl. No.: 12/864,252

(22) PCT Filed: Jan. 25, 2008

(86) PCT No.: PCT/SE2008/050086
§ 371 (c)(1),
(2), (4) Date: Jul. 23, 2010

(87) PCT Pub. No.: WO2009/093943
PCT Pub. Date: Jul. 30, 2009

(65) Prior Publication Data
US 2010/0296547 A1  Nov. 25, 2010

(51) Int. Cl.
*H04B 7/02* (2006.01)
*H04L 1/02* (2006.01)

(52) U.S. Cl. ........ 375/267; 375/299; 375/347; 375/260; 375/135; 375/136; 455/500; 455/101; 455/504; 455/506

(58) Field of Classification Search .............. 375/267, 375/299, 347, 132, 133, 136, 260; 455/500, 455/101, 504, 506
See application file for complete search history.

(56) References Cited

U.S. PATENT DOCUMENTS

| | | | | |
|---|---|---|---|---|
| 6,006,075 | A * | 12/1999 | Smith et al. | 455/101 |
| 6,034,987 | A * | 3/2000 | Chennakeshu et al. | 375/133 |
| 2005/0135324 | A1* | 6/2005 | Kim et al. | 370/343 |
| 2007/0054626 | A1* | 3/2007 | Li et al. | 455/69 |
| 2007/0060178 | A1* | 3/2007 | Gorokhov et al. | 455/506 |

* cited by examiner

*Primary Examiner* — Phuong Phu (57) ABSTRACT

The present invention increases the interference diversity in systems with the frame structure described above by using frequency hopping sequences that are selected considering characteristics of the channel relating to how the channel varies. According to a first embodiment, the channel characteristics relate to channel coherence time and according to a second embodiment, the channel characteristics relate to channel coherence bandwidth. For channels with long coherence times, the transmission hops back and forth several times during a TTI on the different available frequencies. For channels with wide coherence bandwidths, hopping may be performed between the frequency used by the reference signals and its neighbor frequencies. For channels with both long coherence times and wide coherence bandwidths, a combination may be used.

18 Claims, 10 Drawing Sheets

---

Identify at least one channel parameter and its associated value over which the channel is being substantially constant — 901

Modify the used frequency hopping scheme by extending the range of the validity of the reference symbol bursts in a dimension of the identified channel parameter, wherein the data symbols are transmitted within said extended validity to increase interference diversity. — 902

METHOD TO MODIFY THE FREQUENCY HOPPING SCHEME BY EXTENDING THE VALIDITY OF THE REFERENCE SIGNALS

TECHNICAL FIELD

The present invention relates to a method and an arrangement in a mobile telecommunications system. In particular, it relates to a method and an arrangement for enhanced frequency hopping.

BACKGROUND

Frequency hopping is a technique that may be used to enhance the frequency and the interference diversity in mobile telecommunications systems. For example, frequency hopping is employed in GSM and it is also an option in the uplink of the E-UTRA (Enhanced UMTS Radio Access) also referred to as 3GPP Long Term Evolution, LTE.

Frequency hopping spreads the transmission over several different frequencies according to a certain pattern. This pattern must be known by both the transmitter and the receiver. Information regarding the frequency hopping pattern may be broadcasted or signaled in another way. This provides frequency diversity given that the different frequencies are well separated. The separation should exceed the channel coherence bandwidth. Moreover, interference diversity is achieved if different hopping sequences are employed by different users. Frequency hopping should, preferably, be performed within a channel coded block such that the enhanced diversity may be taken advantage of channel coding and interleaving.

Figure 1:
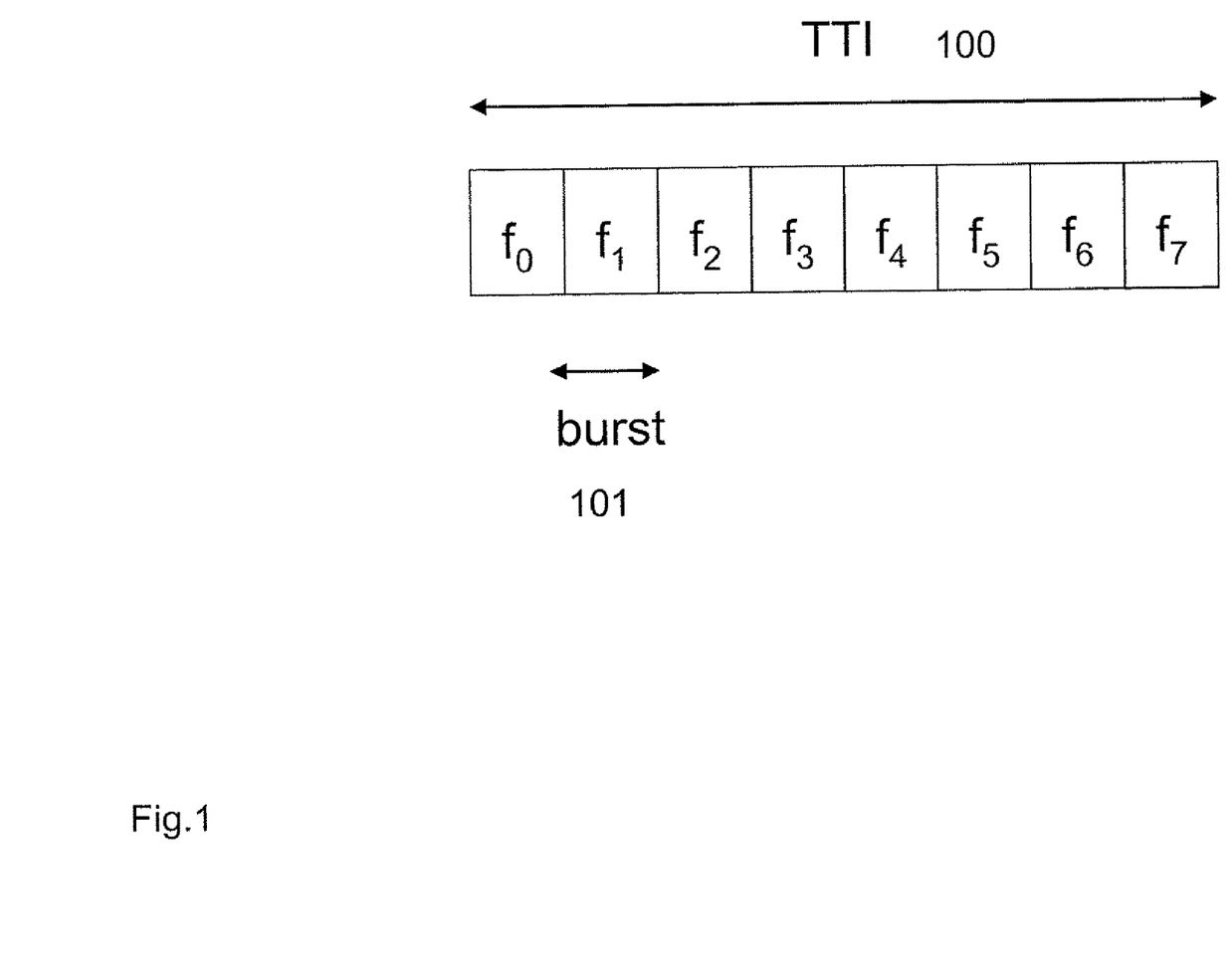
FIG. 1 illustrates a possible frame structure comprising eight bursts that are transmitted on the frequencies $f_0, f_1, \ldots, f_7$ according to prior art.

FIG. 1 gives an example of a possible frame structure comprising eight bursts. The respective bursts of a channel coded packet having the frame structure of FIG. 1 are transmitted on the frequencies $f_0, f_1, \ldots, f_7$. The duration over which the channel coded packet is transmitted is often called the transmission time interval (TTI) here corresponding to eight bursts.

A disadvantage with frequency hopping is that it may increase the required reference signal overhead for a given demodulation performance. With frequency hopping, reference signals for demodulation must be provided for all used frequencies. For example, for the frame structure in FIG. 1, wherein 8 bursts 101 are transmitted in one TTI (Transmit time interval) 100 reference signals for all used frequencies $f_0, f_1, \ldots, f_7$ must be available when the data is demodulated. The reference signals may comprise known symbols that are received in order to learn how to demodulate unknown symbols. E.g. a "0" and a "1" may be transmitted as reference signals and the receiver can then learn how a received "0" and "1" looks on a particular channel and the receiver may then demodulate unknown symbols based on the reception of the reference signal.

Figure 2:
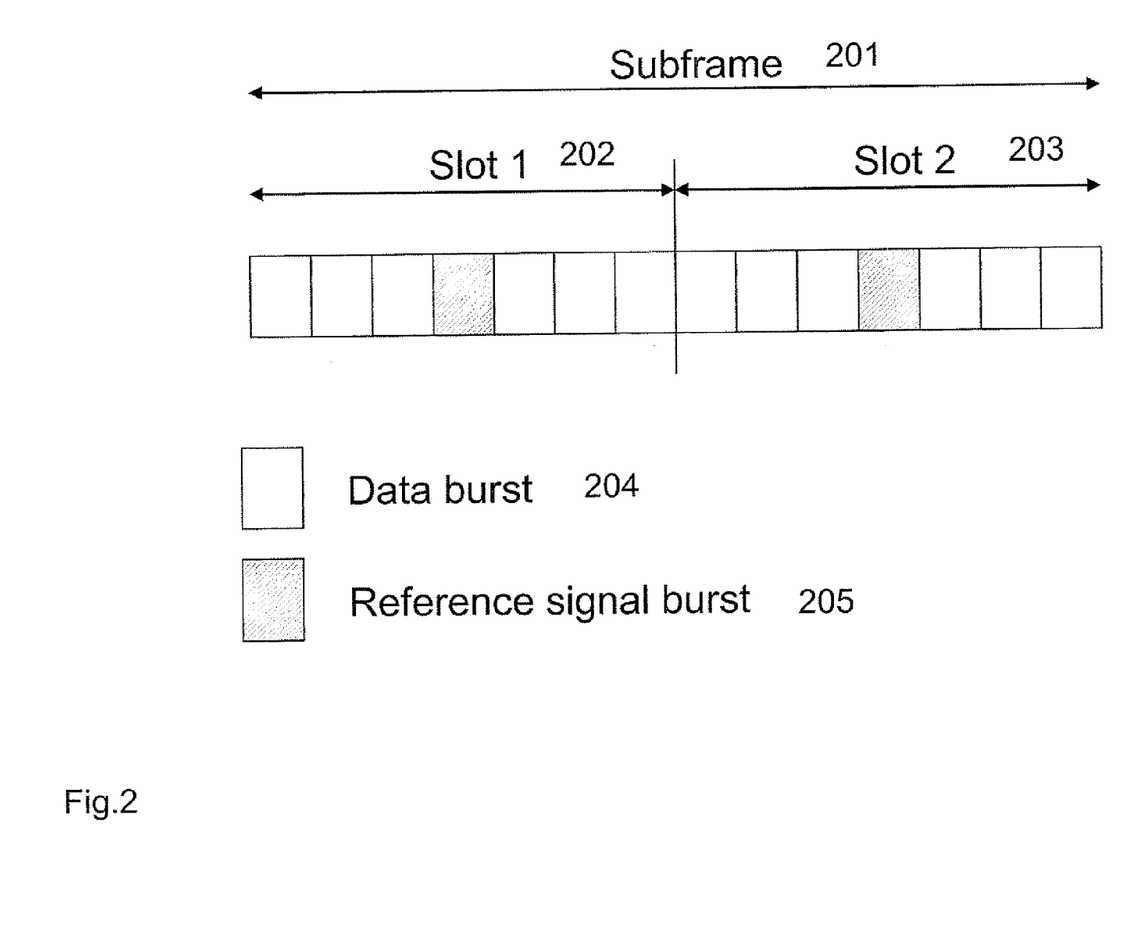
FIG. 2 illustrates E-UTRA uplink frame structure according to prior art.

In GSM, reference signals (also referred to as pilots, or training sequences) are included in each burst. I.e., each burst is self-contained. In E-UTRA uplink, reference signals are separated from the data and transmitted in separate bursts. FIG. 2 illustrates the E-UTRA uplink frame structure. A subframe (TTI) 201 comprises two slots 202, 203 and each slot is made up of seven bursts. Six bursts 204 per slot are used for data transmission while one burst 205 is used for the reference signals for the six bursts within the same slot, which implies that the three first slots have to be stored before they can be demodulated when the reference signal burst is received.

Figure 3:
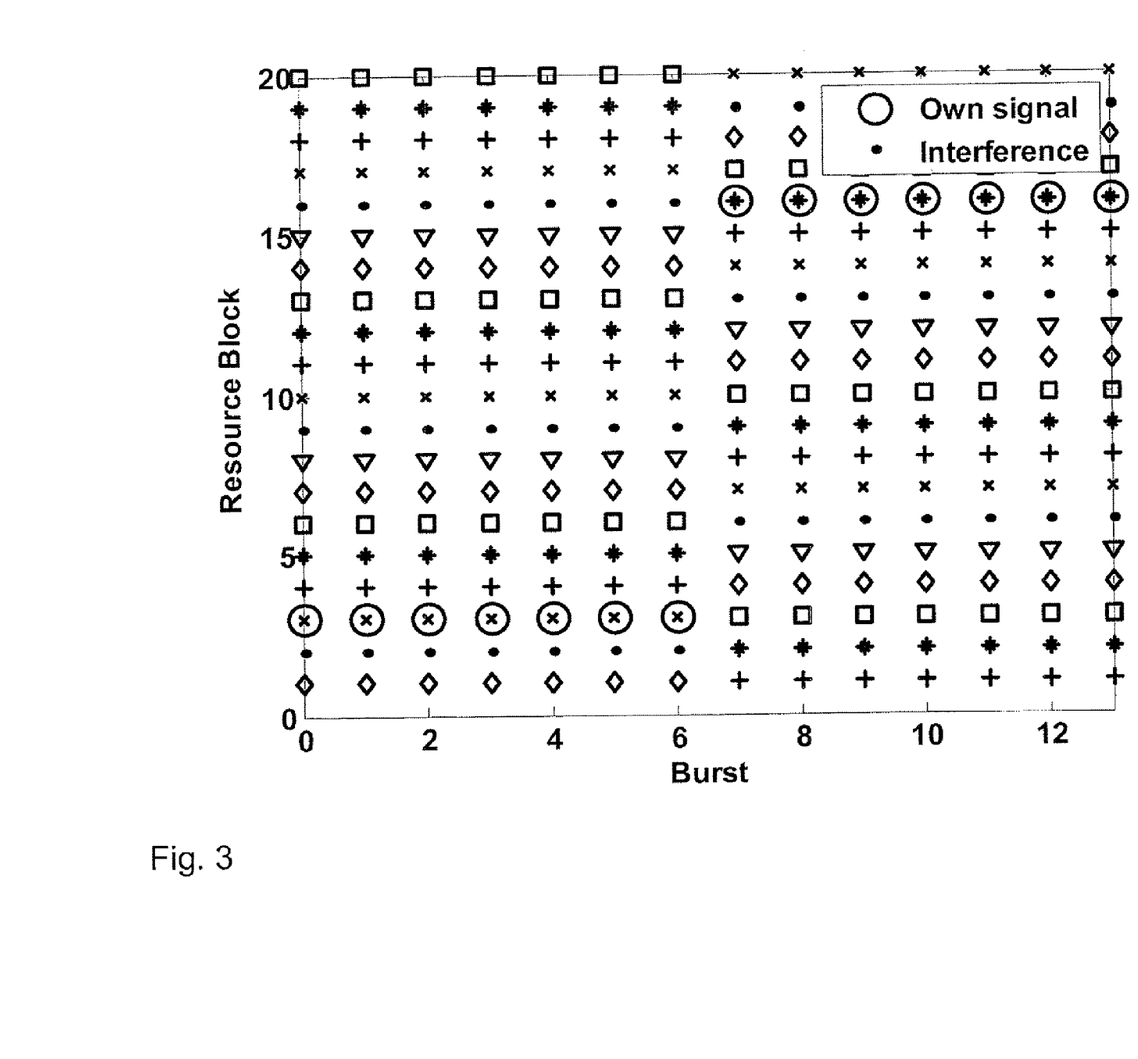
FIG. 3 illustrates that the existing E-UTRA hopping scheme limits the interference diversity to two different interferers.

The E-UTRA uplink frame structure with only two reference signals per subframe (TTI) limits the frequency hopping flexibility. In E-UTRA, the data bursts are transmitted on the same frequencies as the reference signals. Moreover, the data transmission utilizes the same frequency as the in time closest reference signal. That is, the hopping takes place at the slot boundary and there is only one hop per sub-frame which is illustrated by FIG. 3.

The E-UTRA hopping scheme exploits the available frequency diversity considering the available reference signals but does not fully exploit the possible interference diversity since only one hop per subframe is available. Thus since the interference of FIG. 3 is rather constant over a period of time, only two frequencies are used and a low hopping rate is used, the interference diversity is limited to only two interferers.

SUMMARY

As stated above, the interference diversity in the prior art solution is limited to only a few interferers when using a frame structure where data and reference signals are transmitted in different bursts and where the number of data bursts exceeds the number reference signal bursts. Therefore, it would be desirable to achieve a solution that increases the interferer diversity for such a frame structure.

The present invention increases the interference diversity in systems with the frame structure described above by using frequency hopping sequences that are selected considering characteristics of the channel relating to how the channel varies. According to a first embodiment, the channel characteristics relate to channel coherence time and according to a second embodiment, the channel characteristics relate to channel coherence bandwidth. For channels with long coherence times, the transmission hops back and forth several times during a TTI on the different available frequencies. For channels with wide coherence bandwidths, hopping may be performed between the frequency used by the reference signals and its neighbor frequencies. For channels with both long coherence times and wide coherence bandwidths, a combination may be used.

In accordance with a first aspect a method for a radio access network using frequency hopping schemes based on channel parameters comprising time and frequency parameters is provided. The radio access network is configured for transmission of data symbols and reference symbols in different bursts and wherein the number of data symbol bursts exceeds the number reference symbol bursts and the method comprises the steps of identifying at least one channel parameter and its associated value over which the channel is being substantially constant, and modifying the used frequency hopping scheme by extending the range of the validity of the reference symbol bursts in a dimension of the identified channel parameter, wherein the data symbols are transmitted within said extended validity to increase interference diversity.

In accordance with a second aspect an arrangement for a radio access network using frequency hopping schemes based on channel parameters comprising time and frequency parameters is provided. The radio access network is configured for transmission of data symbols and reference symbols in different bursts and wherein the number of data symbol bursts exceeds the number reference symbol bursts. The arrangement comprises means for identifying at least one channel parameter and its associated value over which the channel is being substantially constant, and means for modifying the used frequency hopping scheme by extending the range of the validity of the reference symbol bursts in a dimension of the identified channel parameter, wherein the data symbols are transmitted within said extended validity to increase interference diversity.

An advantage with the present invention is that it enhances the interference diversity, which reduces the variation of the average (effective) SINR in a TTI. Reduced SINR variation implies higher prediction accuracy that in turn facilitates that the interference margins in e.g. link adaptation and power control algorithms can be reduced and the reduced margins increase system capacity.

DETAILED DESCRIPTION

Figure 8:
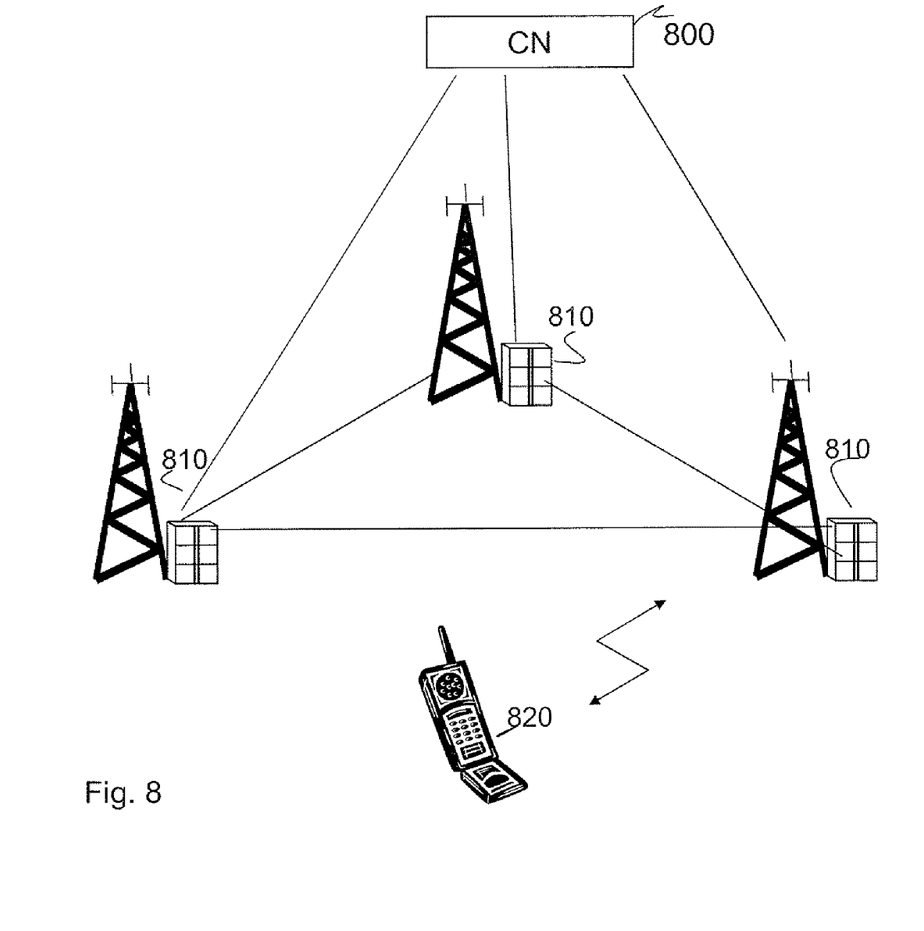
FIG. 8 illustrates schematically a mobile telecommunication network wherein the present invention may be implemented.

The present invention relates to frequency hopping schemes to be used in a radio access network comprising e.g. radio base stations 800 connected to a CN 810 as in the E-UTRAN which is illustrated in FIG. 8. The mobile terminals 820 (only one is shown in FIG. 8) are connected wirelessly to one or more radio base stations 800 and the CN 810 interconnects the mobile telecommunication to other networks.

Figure 9:
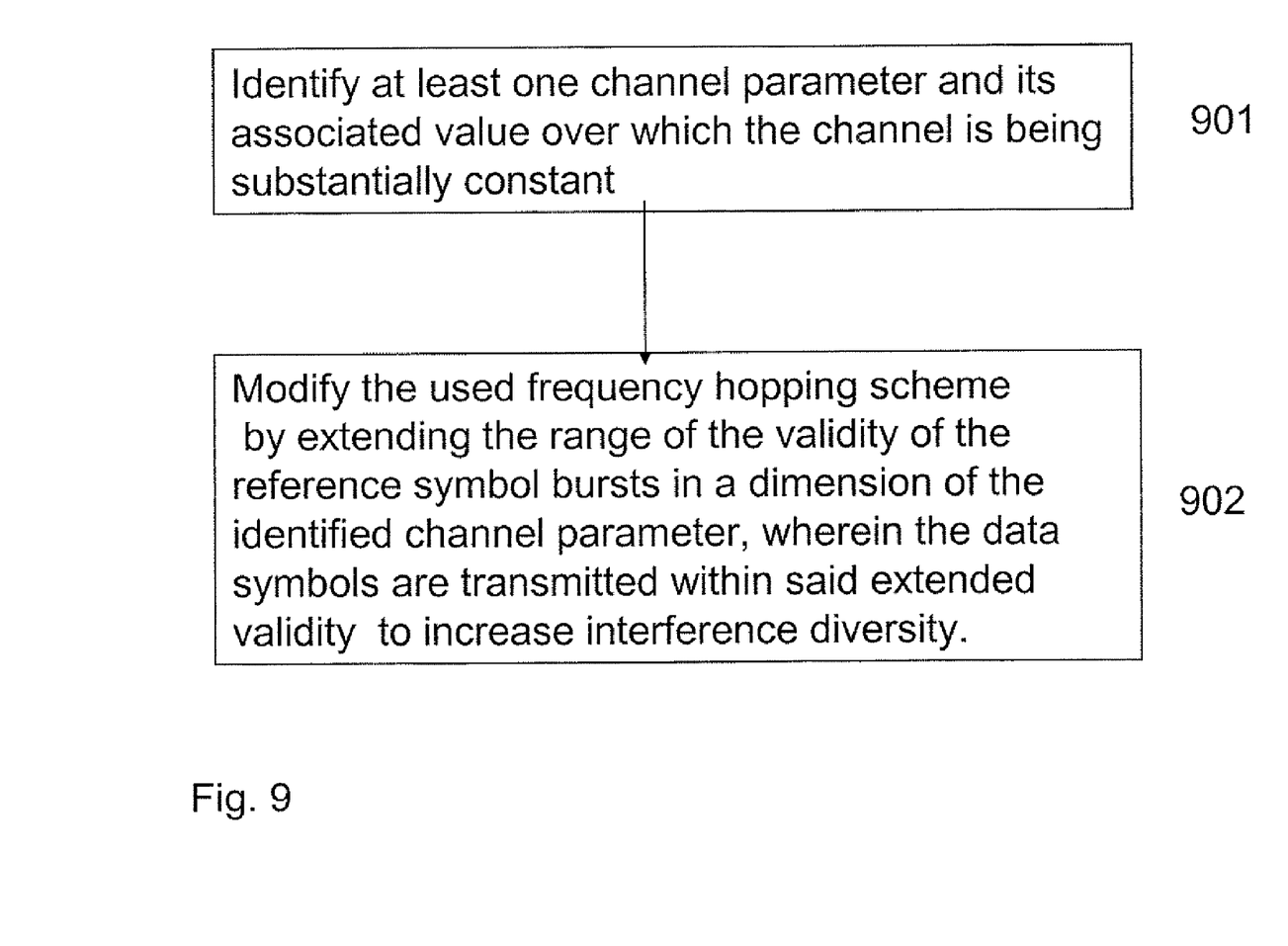
FIG. 9 is a flowchart of the method of the present invention.

The basic idea of the present invention is to determine suitable frequency hopping sequences based on channel characteristics such as channel coherence time and channel coherence bandwidth. This can be done by either using a dynamic or a more static approach. The idea is illustrated by the flowchart of FIG. 9, which illustrates that this is achieved by identifying 901 at least one channel parameter and its associated value, i.e. channel coherence time or channel coherence bandwidth, over which the channel is being substantially constant. The used frequency hopping scheme is then modified 902 by extending the range of the validity of the reference symbol bursts in a dimension of the identified channel parameter, i.e. in the frequency domain or in the time domain, wherein the data symbols are transmitted within said extended validity to increase interference diversity. Thus, the validity of a reference symbol burst may either be extended in the time domain or in the frequency domain, which implies that data symbols may be transmitted on a wider range of time and frequency instants than what is being originally specified.

Channel coherence bandwidth is a measure of how the channel varies over the frequency and channel coherence time is a measure how the channel varies over time. The properties of a channel with a long coherence time are substantially constant during a period of time while the properties of a channel with a wide coherence bandwidth are substantially constant over a plurality frequencies.

One way to define the channel as substantially constant is to define it as when the channel has not changed more than that an acceptable loss of e.g. 0.5 dB is given if it is being assumed that the channel is constant.

The present invention relates to a solution for a radio access network that uses frequency hopping sequences that depend on the channel coherence time and the channel coherence bandwidth as stated above. In the following, the E-UTRA uplink frame structure illustrated in FIG. 2 is used for illustration purposes, however similar frame structures may also be used where data and reference signals are transmitted in different bursts and where the number of data bursts exceeds the number reference signal bursts.

It is further assumed that different users in the same cell are assigned different hopping patterns. It should be noted that in a cellular telecommunication system, using orthogonal hopping patterns within a cell, all users within the cell must typically hop according to the same hopping pattern principle. E.g. the users within a cell hop according to the same pattern but each hop pattern is offset to other hop pattern within the same cell. This may imply that it is the user with the shortest coherence time (or the narrowest coherence bandwidth) that determines how the hopping should be performed.

An example in which the channel coherence time is long is first described. Then, an example in which the channel coherence bandwidth is wide is described. In case both the channel coherence time is long and the channel coherence bandwidths is wide, the two approaches below may be combined.

Thus according to a first embodiment the channel parameter and its associated value is the coherence time. When the coherence time is long the reference signals may be valid for a time longer than one slot. The channel coherence time is usually long when the UE is stationary or when the UE is moving slowly. In a situation where the channel coherence time is long, the reference symbols in the first reference symbol burst may be used for data demodulation during the entire TTI. Similarly, the channel estimate obtained from the second reference symbol burst is also valid during the entire TTI. In this case, the data transmission must not necessarily take place at the same frequency as is used by the in time closest reference signal. Instead, the interference diversity may be enhanced by hopping several times back and forth between the available frequencies related to the first and second reference signals.

It should be noted that reference signal is also being referred to as reference symbols and similarly, data signal is also being referred to as data symbols.

Figure 4:
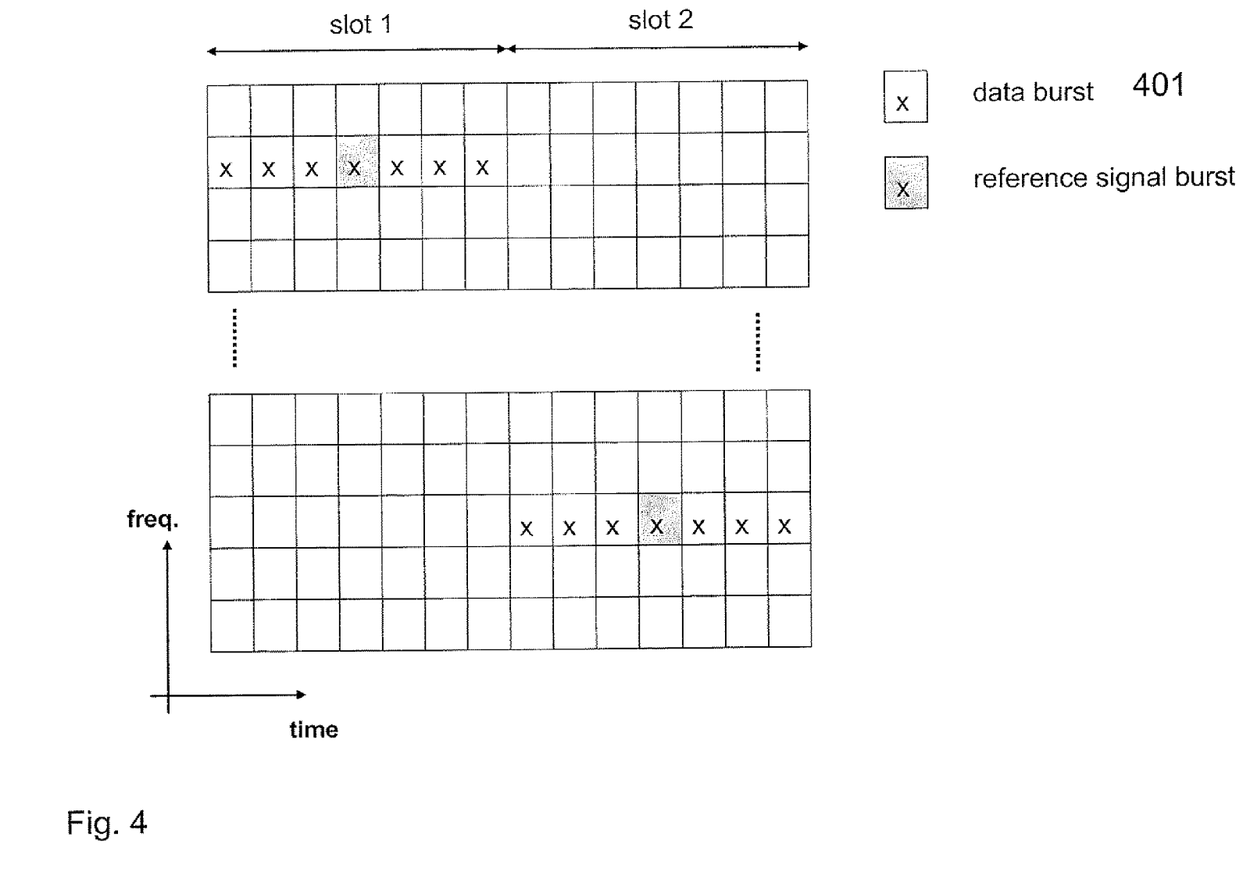
FIG. 4 illustrates the existing E-UTRA frequency hopping principle.
Figure 5:
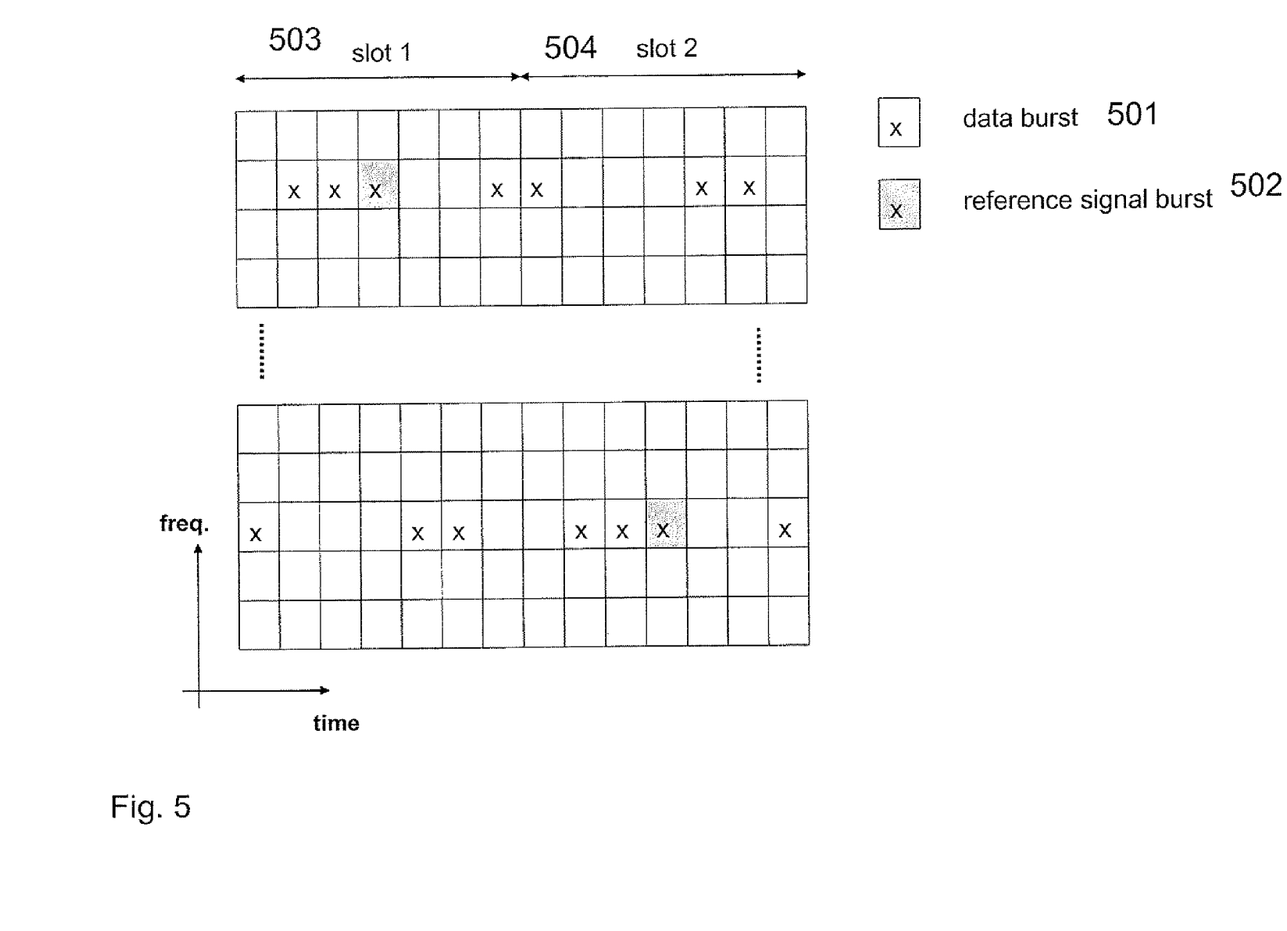
FIG. 5 illustrates an enhanced frequency hopping sequence when channel coherence time is long in accordance with one embodiment of the present invention.

FIG. 4 depicts an example of an E-UTRA hopping sequence according to prior art where only one hop per subframe for the data bursts 401 is possible. In contrast, FIG. 5 depicts an example of a hopping sequence derived according to an embodiment of the present invention where it is possible to use frequencies of other reference symbols 502 than the reference symbol 502 of the same slot 503, 504 for the data bursts 501. The two hopping sequences provide the same degree of frequency diversity while, provided that users in neighboring cells hop according to the same principles but with different sequences, however the proposed hopping pattern according to the present invention provides enhanced interference diversity. This is illustrated in FIG. 5.

For simplicity a two-cell scenario is considered, i.e., there is only one interfering cell. For E-UTRA frequency hopping, the interference will originate from two sources—one interference source during the first slot and another interference source during the second slot. To enhance the interference diversity, hopping sequences RB(l) is derived, which is a function of the burst number l, exemplified by the following algorithm:

$$RB(l)=\mathrm{mod}(r\mathrm{bid}+K_0\cdot[\mathrm{mod}((l+\mathrm{cellid}),K_1)/K_1],N_{RB})+1,$$

with $$K_1=\mathrm{mod}(\mathrm{cellid},7)+1$$

Here, rbid is the resource block assignment provided by the scheduler, cellid is the cell number, $K_0$ is the hop size and $K_1$ is the hopping period, RB is the hopping frequency. $N_{RB}$, finally, is the number of resource blocks available. mod is the abbreviation for modulus where $\mathrm{mod}(x,y)=x-n*y$, where $n=[x/y]$ and $[x/y]$ is $x/y$ rounded downwards.

In this example a system with 20 resource blocks ($N_{RB}=20$) is studied. With the cell of interest having cell number 17 (cellid=17) and $K_0=13$, a hopping period of four ($K_1=4$) is given. rbid=2 for the user of interest is further set. It is assumed that the interfering cell has cell number 43 and uses $K_0=13$.

Figure 6:
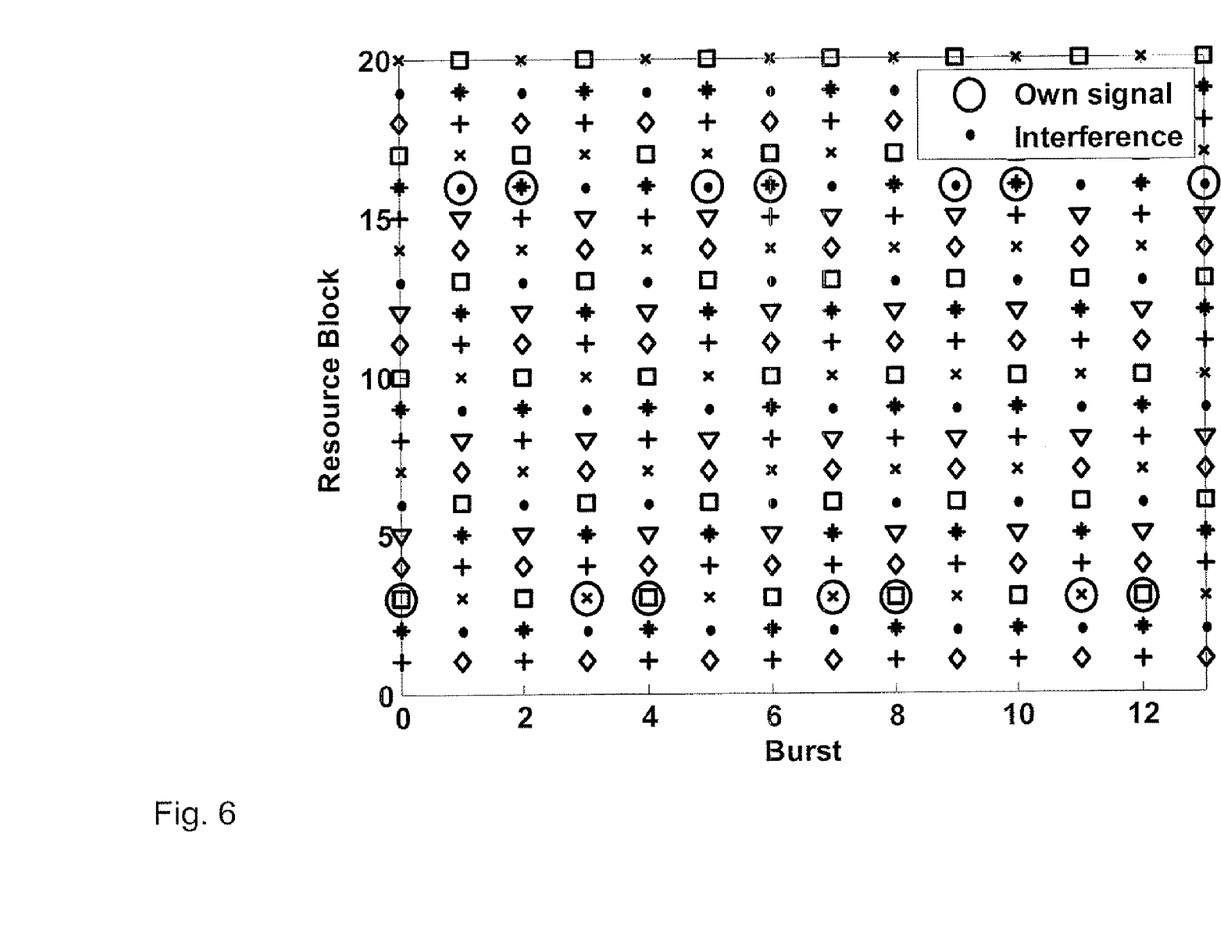
FIG. 6 identifies inter-cell interference sources for one realization of the method according to one embodiment of the present invention.

This example provides a situation in accordance with FIG. 6. Note that the reference signal bursts are not depicted in FIG. 6, but it is assumed that one reference signal burst is transmitted on each used frequency. The number of interfering sources has here increased from two to four, i.e., the interference diversity has increased.

The pattern defined by how the crosses are grouped is preferably the same for all UEs within the same cell as illustrated in FIG. 5. However the pattern defined by how the crosses are grouped differs between the cells in order to achieve interference diversity.

The prior art solution allows one group of crosses per reference signal, while the present invention allows a number of groups of crosses that are greater than the number of reference signals, wherein one group of crosses indicates a frequency hop.

In accordance with a further embodiment the channel parameter and its associated value is the coherence bandwidth. The channel coherence bandwidth is usually wide when there is a small time dispersion, e.g. in a small cell or in a larger cell without obstacles.

Figure 7:
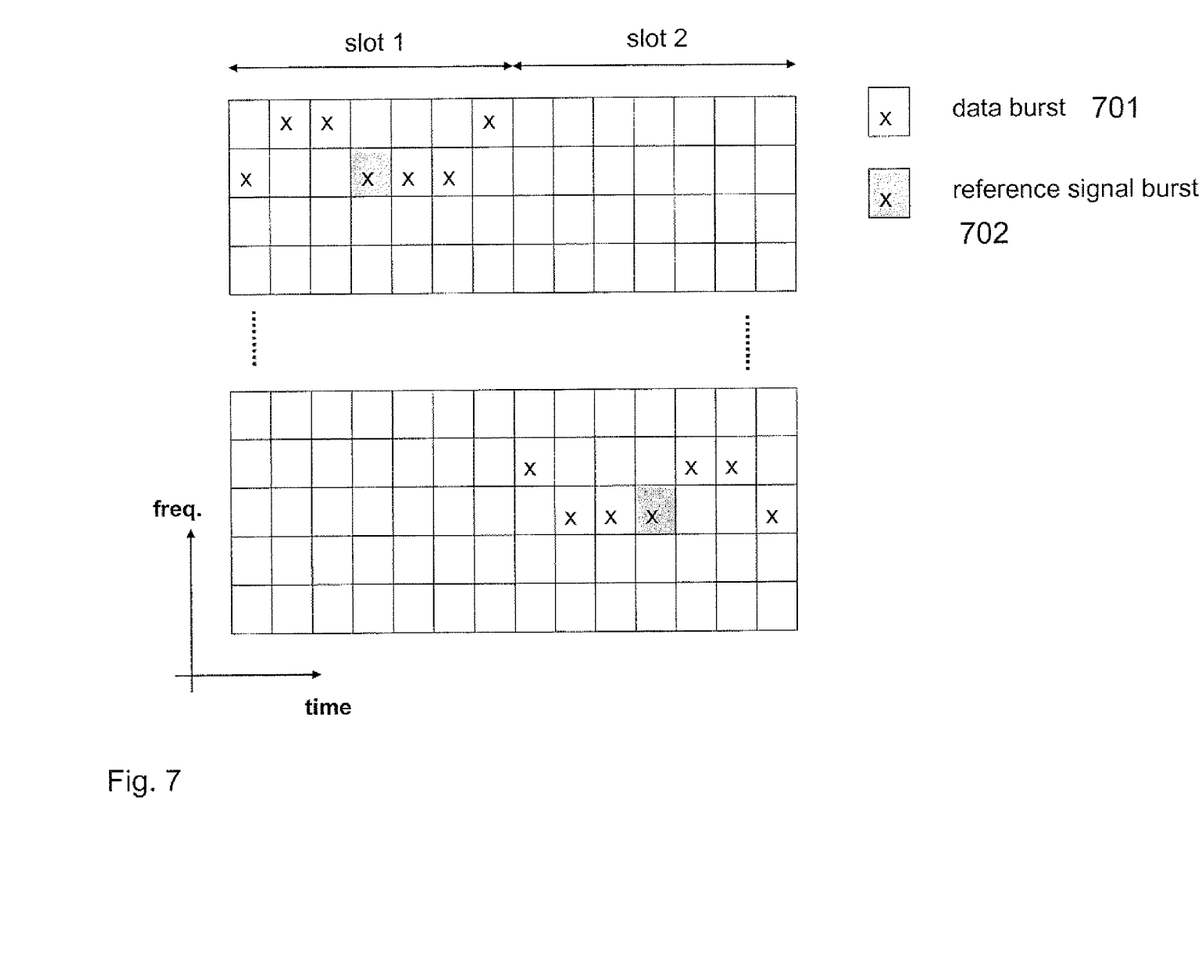
FIG. 7 illustrates an example of enhanced frequency hopping sequence when channel coherence bandwidth is wide according to one embodiment of the present invention.

When channel coherence bandwidths are wide, data 701 is not only transmitted on the same frequencies as the reference signal burst 702 but also on neighboring frequencies according to the second embodiment of the present invention. An example of such a frequency hopping sequence is depicted in FIG. 7. In comparison to the E-UTRA hopping sequence in FIG. 4, the hopping sequence illustrated in FIG. 7 enhances the interference diversity.

The method according to the present invention illustrated in conjunction with FIG. 9 may be implemented in an arrangement for a radio access network. The radio access network uses frequency hopping schemes based on channel parameters comprising time and frequency parameters and the radio access network is configured for transmission of data symbols and reference symbols in different bursts and wherein the number of data symbol bursts exceeds the number reference symbol bursts. The arrangement according to one embodiment schematically illustrated in FIG. 10 comprises means 1001 for identifying at least one channel parameter and its associated value over which the channel is being substantially constant, and means 1002 for modifying the used frequency hopping scheme by extending the range of the validity of the reference symbol bursts in a dimension of the identified channel parameter, wherein the data symbols are transmitted within said extended validity to increase interference diversity.

Figure 10:
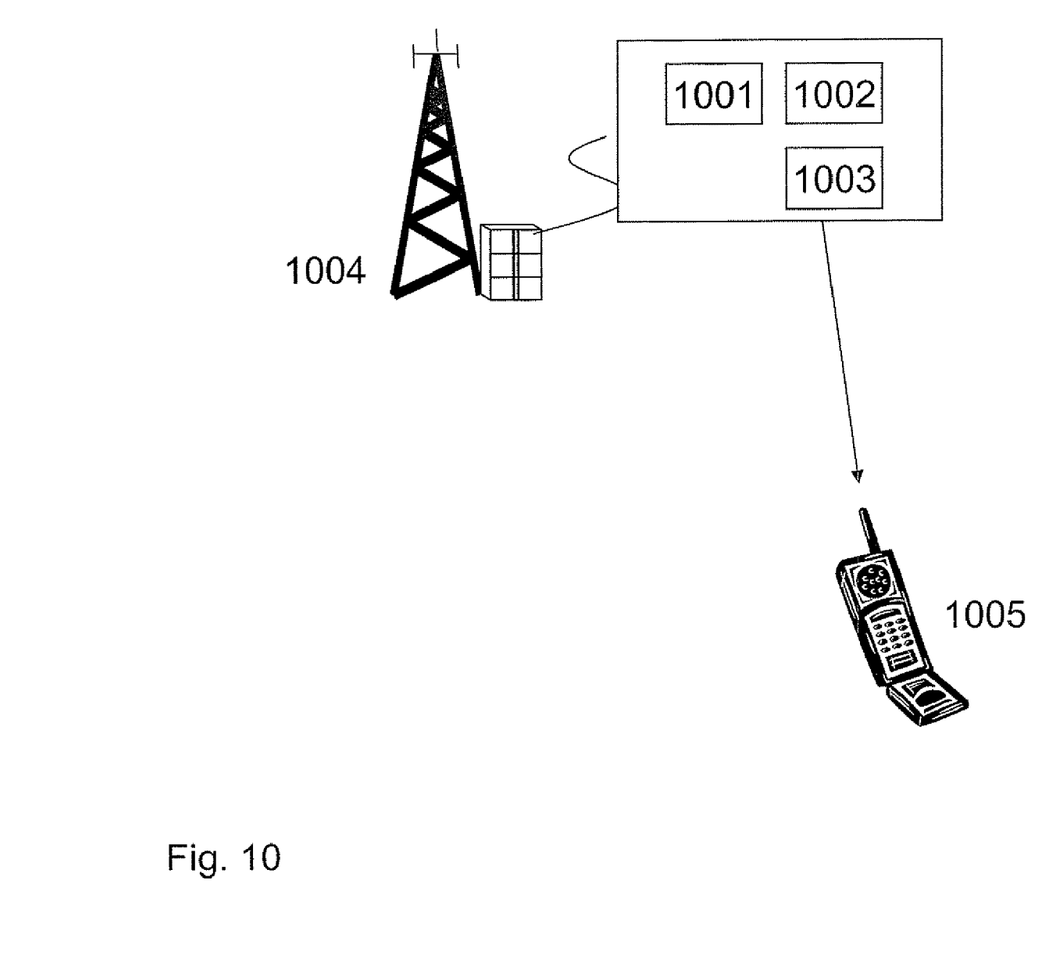
FIG. 10 illustrates schematically the arrangement according to the present invention.

The frequency hopping sequence may be determined either in the transmitter or in the receiver. What is important is that both the transmitter and the receiver know the hopping sequence. Hopping sequences are often set in standards and often the radio base station 1004 comprises means 1003 for signaling to the mobile terminals 1005 which hopping sequence that should be used.

It may be either in the transmitter or in the receiver that it is determined whether the channel coherence bandwidth is wide or whether the channel time coherence bandwidth is long. The needed measurements are typically performed in the receiver and then these may be processed in the receiver or signaled to the transmitter for processing.

In a cellular system with a base station serving multiple user terminals the measurements may be collected in the radio base station (acting as transmitter in downlink and receiver in uplink) and the radio base station then determines whether the channel coherence time is long and/or the channel coherence bandwidth is wide.

Thus the arrangement of the present invention may be implemented in a transmitter or a receiver. Said transmitter and receiver are preferably implemented in a radio base station but can also be implemented in a mobile terminal.

It should be noted that the means mentioned in the present specification can be software means, hardware means or a combination of both.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for a radio access network using frequency hopping schemes based on channel parameters comprising time and frequency parameters, the radio access network is configured for transmission of data symbols and reference symbols in different bursts and wherein the number of data symbol bursts exceeds the number reference symbol bursts, the method is characterised by the steps of:
   identifying at least one channel parameter and its associated value over which the channel is being substantially constant, and
   modifying the used frequency hopping scheme by extending the range of the validity of the reference symbol bursts in a dimension of the identified channel parameter, wherein the data symbols are transmitted within said extended validity to increase interference diversity.

2. The method according to claim 1, wherein the at least one identified channel parameter is a time parameter implying a long channel coherence time.

3. The method according to claim 2, wherein one slot comprises a plurality of data symbol bursts and one reference symbol burst, and in at least one previous slot, the one reference symbol burst is valid.

4. The method according to claim 2, wherein one slot comprises a plurality of data symbol bursts and one reference symbol burst, and in at least one subsequent slot, the one reference symbol burst is valid.

5. The method according to claim 1, wherein the at least one identified channel parameter is a frequency parameter implying a wide channel coherence bandwidth.

6. The method according to claim 5, wherein the reference symbol bursts are valid on at least one neighboring frequency of the reference symbol bursts.

7. The method according to claim 1, wherein the at least one identified channel parameter is a time parameter implying a long channel coherence time and a frequency parameter implying a wide channel coherence bandwidth.

8. The method according to claim 7, wherein one slot comprises a plurality of data signal bursts and one reference symbol burst, the one reference signal burst is valid in at least one previous or subsequent slot, and the one reference symbol burst is valid on at least one neighboring frequency of the reference symbol burst.

9. An arrangement for a radio access network using frequency hopping schemes based on channel parameters comprising time and frequency parameters, the radio access network is configured for transmission of data symbols and reference symbols in different bursts and wherein the number of data symbol bursts exceeds the number reference symbol bursts, the arrangement is characterised by:
   means for identifying at least one channel parameter and its associated value over which the channel is being substantially constant, and
   means for modifying the used frequency hopping scheme by extending the range of the validity of the reference symbol bursts in a dimension of the identified channel parameter,
   wherein the data symbols are transmitted within said extended validity to increase interference diversity.

10. The arrangement according to claim 9, wherein the at least one identified channel parameter is a time parameter implying a long channel coherence time.

11. The arrangement according to claim 10, wherein one slot comprises a plurality of data symbol bursts and one reference symbol burst, and in at least one previous slot the one reference symbol burst is valid.

12. The arrangement according to claim 10, wherein one slot comprises a plurality of data symbol bursts and one reference symbol burst, and in at least one subsequent slot, the one reference symbol burst is valid.

13. The arrangement according to claim 9, wherein the at least one identified channel parameter is a frequency parameter implying a wide channel coherence bandwidth.

14. The arrangement according to claim 13, wherein the reference symbol bursts are valid on at least one neighboring frequency of the reference symbol bursts.

15. The arrangement according to claim 9, wherein the at least one identified channel parameter is a time parameter implying a long channel coherence time and a frequency parameter implying a wide channel coherence bandwidth.

16. The arrangement according to claim 15, wherein one slot comprises a plurality of data signal bursts and one reference symbol burst, the one reference signal burst is valid in at least one previous or subsequent slot, and the one reference symbol burst is valid on at least one neighboring frequency of the reference symbol burst.

17. The arrangement according to claim 9, wherein the arrangement is configured to be implemented in association with a transmitter.

18. The arrangement according to claim 9, wherein the arrangement is configured to be implemented in association with a receiver.

* * * * *

UNITED STATES PATENT AND TRADEMARK OFFICE
CERTIFICATE OF CORRECTION

PATENT NO. : 8,363,746 B2
APPLICATION NO. : 12/864252
DATED : January 29, 2013
INVENTOR(S) : Skillermark et al.

It is certified that error appears in the above-identified patent and that said Letters Patent is hereby corrected as shown below:

Title Page, Item (75), under "Inventors", in Column 1, Line 2, delete "Furuskar," and insert -- Furuskär, --, therefor.

In the Claims

In Column 8, Line 3, in Claim 11, delete "slot" and insert -- slot, --, therefor.

Signed and Sealed this
Fourteenth Day of May, 2013

Teresa Stanek Rea
*Acting Director of the United States Patent and Trademark Office*